No. 867,342. PATENTED OCT. 1, 1907.
L. BOISARD.
CUTTER FOR STRAIGHT, HELICOIDAL, AND CONICAL GEAR TEETH.
APPLICATION FILED DEC. 21, 1905.

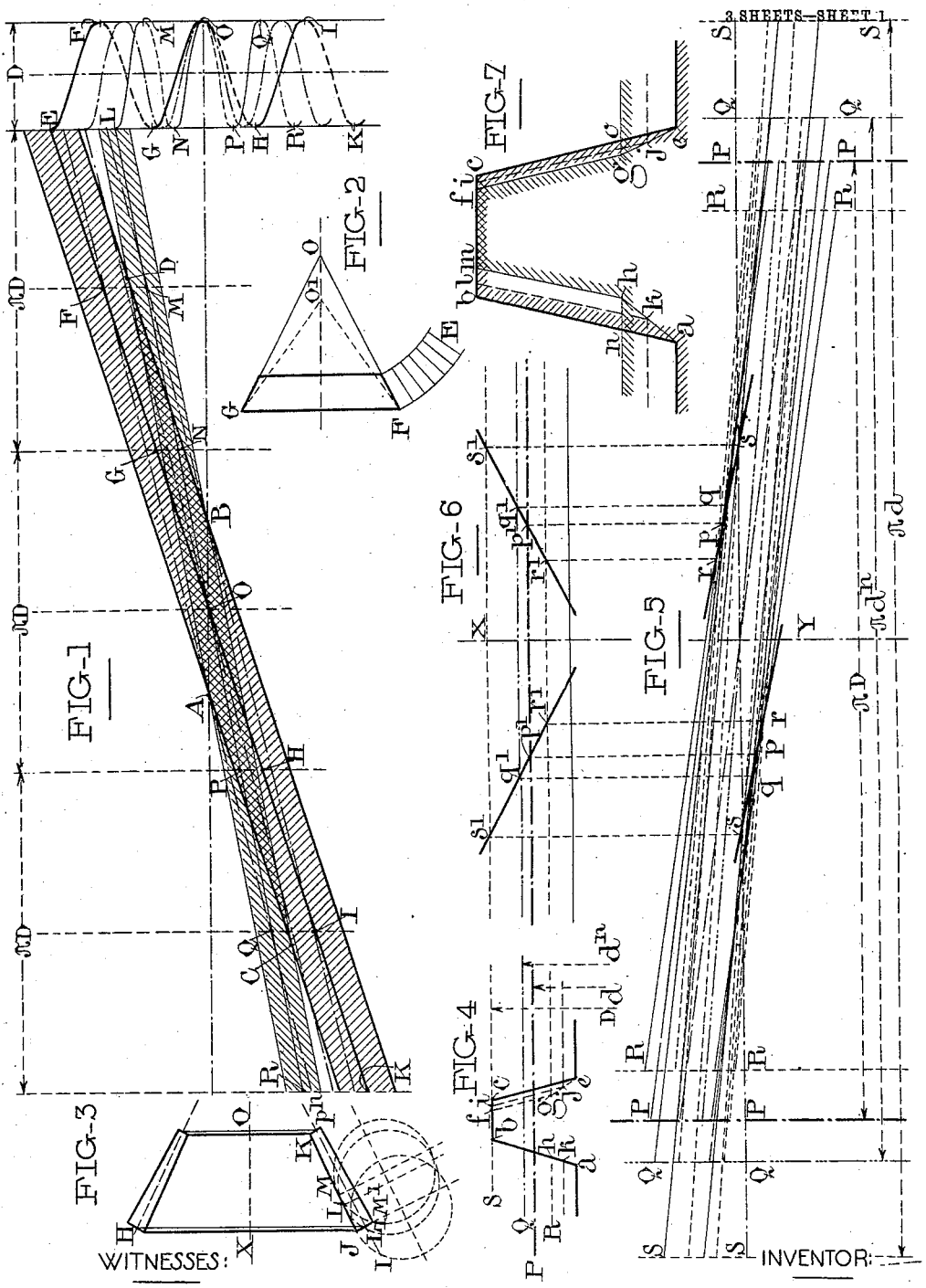

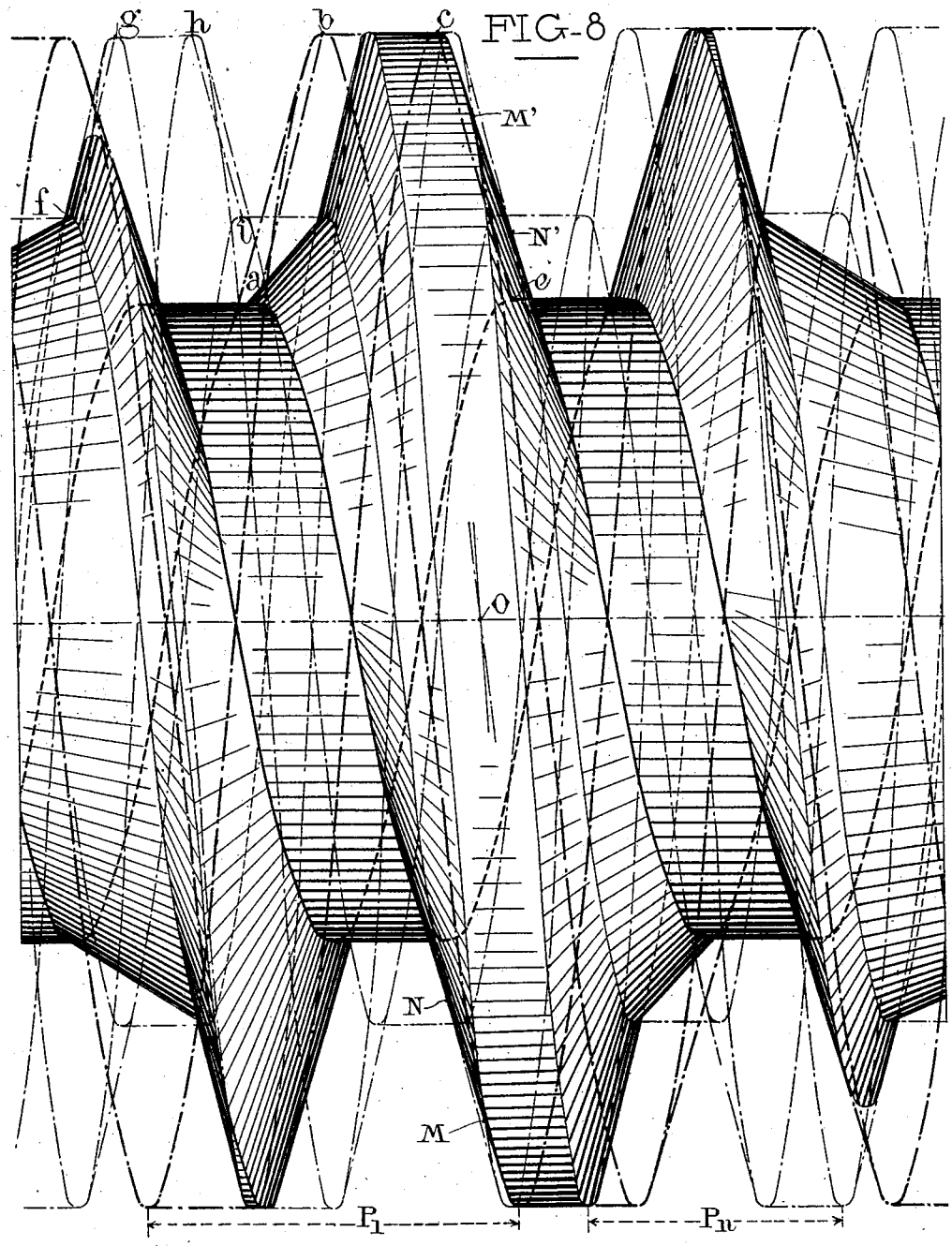

3 SHEETS—SHEET 3.

WITNESSES
INVENTOR
Louis Boisard

UNITED STATES PATENT OFFICE.

LOUIS BOISARD, OF LYON, FRANCE.

CUTTER FOR STRAIGHT, HELICOIDAL, AND CONICAL GEAR-TEETH.

No. 867,342.  Specification of Letters Patent.  Patented Oct. 1, 1907.

Application filed December 21, 1905. Serial No. 292,774.

*To all whom it may concern:*

Be it known that I, LOUIS BOISARD, a citizen of the French Republic, residing at Lyon, in France, have invented a certain new and useful Cutter for Straight, Helicoidal, and Conical Gear-Teeth, of which the following is a specification.

This invention relates to an improved milling cutter for cutting gear teeth, its construction being such that the same cutter may be used for cutting the teeth of gears of different pitch between the two extreme pitches for which the cutter has been designed.

Since the cutter when used in the manner hereinafter referred to is capable of cutting teeth of profile suitable for true rolling contact at any pitch between the two said extreme pitches, it can be used for cutting beveled teeth provided the pitch near the apex and the pitch furthest from the apex do not respectively surpass the said extreme pitches. It can also be used for cutting parallel or beveled gear with helicoidal teeth. The cutter is produced by the superposition of two threads and the method of using it is the subject of another application for patent Serial Number 263,225.

Figure 11:
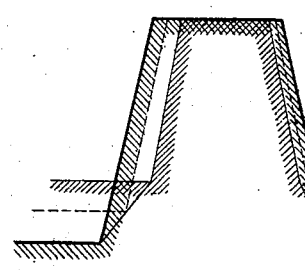
Figure 9:
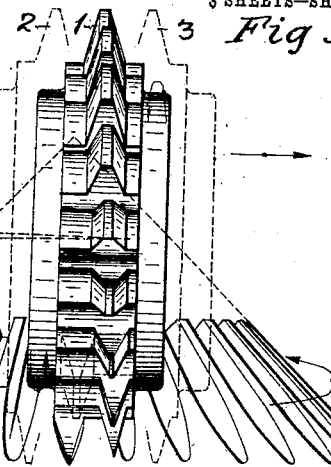
Figure 10:
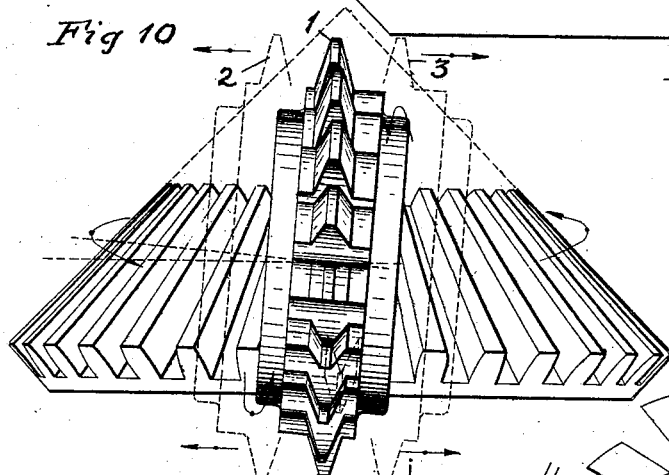
Figure 12:
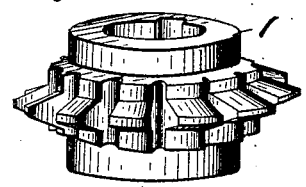
Figure 13:
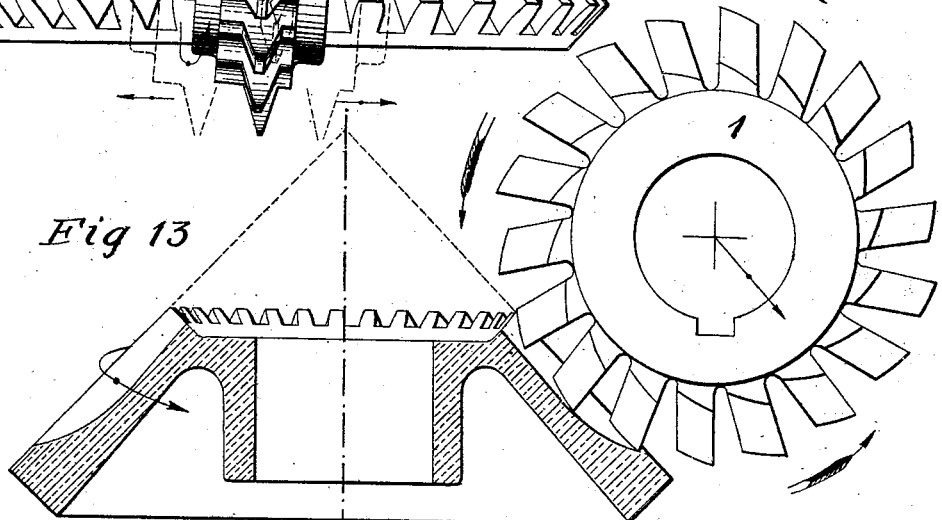

In the annexed drawings Figures 1 to 8 are diagrams illustrative of the description of the method of constructing the cutter. Figs. 9 to 13 illustrate the manner of using the same. Fig. 1 is a diagram illustrating the development of the contour of the cutter but without illustrating the division of the thread of the cutter into separate cutting teeth. Fig. 2 is a diagram illustrating the development of a beveled wheel as a circular rack. Fig. 3 illustrates the cutting of a beveled wheel. Fig. 4 is a diagram of a section of the cutter thread illustrating the superposition of three threads. Fig. 5 is a development diagram illustrating the position of certain points on the primaries of superposed threads. Fig. 6 is a projection of these points into the plane of the diagram in Fig. 4. Fig. 7 is an enlarged view illustrating the superposition of the threads. Fig. 8 illustrates the cutter before the thread is divided into cutting teeth. Fig. 9 is a view illustrating the cutting of the teeth of a beveled wheel, the cutter being in the position corresponding to the cutting of the teeth where the pitch is smallest namely near the apex of the cone. Fig. 10 is a similar view illustrating the position of the cutter when the largest pitch is being cut. Fig. 11 is an enlarged diagram of the tooth. Fig. 12 is a perspective view of the cutter. Fig. 13 is a sectional view illustrating the action of the cutter on a beveled wheel blank.

In order that this invention may be more easily understood I will first refer to the principles of the known method of cutting teeth by means of helicoidal cutters.

Straight and helicoidal gear teeth have been cut hitherto by means of milling cutters in the form of helices the pitch ($p_1$) of which is, with regard to the pitch ($p$) of the gears to be cut, in the equation,—

$$p = p_1 \cos \alpha$$

where $\alpha$ is the angle contained by a tangential line perpendicular to a generator of the primary cylinder of the helical cutter and by a tangent to the helix at the intersection of this generator.

The operation of cutting a wheel of $n$ teeth is performed by inclining the cutter at the angle $\alpha$ with regard to the plane of the wheel and by revolving said cutter and wheel in such a manner that the wheel makes one revolution while the cutter makes $n$ revolutions. The helical cutter may approximate to a rack adapted to cut teeth which are theoretically exact. If the rack, that is to say the cutter, has teeth with straight symmetrical sides, it cuts a wheel the teeth of which are in profile volute, and consequently a cutter with pitch $p_1$ will impart the exact profile to any wheel with pitch $p$, for any number of teeth, provided, of course, that the cutter has either a sufficient number of convolutions to continue cutting action on the teeth until they are carried by the revolution of the blank out of the range of action of the cutting teeth or that a globular helical cutter is used. The angle $\alpha$ of the tangent to the thread can easily be determined if the diameter ($d$) at the point of contact of the helical cutter is known, since $$\tan \alpha = \frac{p_1}{\pi d}.$$

From this it follows that the pitch of the wheels which a helical cutter can produce is intimately connected with the angle of inclination of the cutter-thread, this angle being in turn subject to the diameter of the helix. The same cutter can also cut helical gears with pitch P so that $$P = \frac{p}{\cos \beta} = \frac{p_1 \cos \alpha}{\cos \beta}$$

where $\beta$ is the angle which the teeth of the helical wheel make to the axis thereof. Finally the cutter can be used to cut any worm-wheel with a concave rim adapted to gear with a worm having the same diameter, pitch and axis direction as the helical cutter.

The helical cutters hitherto used have had a single thread of given pitch. My improved cutter is constructed in a different way. It consists of a thread of a given pitch on which is superposed a thread of another pitch so that the cutting part is comprised only in that part which is common to the two threads. The constitution of this cutter is based on the following theory. A steel cylinder can, however, be turned in a lathe in such a manner as to give it a thread of pitch $p_1$ adapted to cut a straight gear of pitch $p$, when $$p = p_1 \cos \alpha,$$

and a thread of pitch $p^n{}_1$ can then be superposed on the first thread, the second thread being adapted to cut a straight gear of pitch $p^n$. It is interesting to study the form which the resultant thread (pitch $p_1$) will take if the primaries coincide.

Reference being made to the drawings filed herewith in which Figs. 1 to 8 are illustrative of the method of forming the cutter hereinafter more particularly explained:—Given a cylinder of diameter D (Fig. 1), let there be traced thereon a helix E F G O H I K of pitch $P_1$, and also a helix L M N O P Q R of pitch $P_n$ intersecting the former helix at O. Let these helices be developed by rolling the cylinder in a plane, and two straight lines E F G O H I K and L M N O P Q R will be obtained. Thereupon let two straight lines be traced, parallel with E F G O H I K and equidistant from the latter, and a band or thread is obtained, of width $l_1 = Q\, P_1$, Q being a given constant. If a similar operation is performed with regard to the line L M N O P Q R, a second thread is obtained of width $l_n = Q\, P_n$. The part common to both threads is the parallelogram A D B C, having the sides A C and B D on the thread $P_1$ and the sides A D and B C on the thread $P_n$. Now let a similar thread be traced, of the intermediate pitch $P_k$, with its central convolution passing through O. The thickness of this thread will be $l_k = Q\, P_k$ and the two helices limiting the thread will pass through the points A and B but will only have these two points in common with the parallelogram A D B C. It follows that the sides of all similar threads with pitches varying from $P_1$ to $P_n$, and central convolutions passing through O, will pass through the points A and B, and the surface common to all these threads will be the parallelogram A D B C, the sides of which belong to the threads of maximum and minimum pitch $P_1$ and $P_n$. Of all these threads, let only the portion represented by the parallelogram A D B C be retained on the cylinder, and let this portion be in relief to an infinitely small extent, which enables it to produce its mark on a body with which it comes into contact; also let $\alpha_1$, $\alpha_k$ and $\alpha_n$ be the angles of inclination of the helices of pitches $P_1$, $P_k$ and $P_n$ respectively, to a cross-section of the cylinder. If, thereupon, the cylinder, inclined at the angle $\alpha_1$ is revolved in contact with a smooth-rimmed cylindrical wheel of the desired diameter, as in the case of cutting cylindrical gear-wheels by means of a helicoidal cutter, said smooth-rimmed wheel being itself rotated and connected with the cylinder by means of a suitable desmodromic movement, and if the cylinder is, while it revolves, moved parallelly to the axis of the wheel, a series of rectangular markings will be produced on the latter, corresponding to spaces between teeth of pitch $p_1$, where $$p_1 = P_1 \cos \alpha_1$$

and the width $$Q\, p_1 = Q\, P_1 \cos \alpha_1$$

these markings being produced by the sides A C and B D belonging to the thread $P_1$.

If the operation is repeated with the cylinder inclined at the angle $\alpha_n$ with regard to another smooth-rimmed wheel of suitable diameter, rectangular markings of pitch $p_n$ are obtained, where $$p_n = P_n \cos \alpha_n$$

and the width $$Q\, p_n = Q\, P_n \cos \alpha_n.$$

These markings are produced by the sides A B and B C belonging to the thread $P_n$.

With the cylinder inclined at an angle $\alpha_k$ intermediate to $\alpha_1$ and $\alpha_n$, a wheel of the desired diameter is furnished with markings of pitch $$p_k = P_k \cos \alpha_k$$

and width $$Q\, p_k = Q\, P_k \cos \alpha_k$$

these markings being produced by what remains of the intermediate thread $P_k$, that is to say the points A and B only. Let thereupon a conical wheel be treated by means of the cylinder, the pitches for the teeth to be cut on said wheel being $p_1$ at the major base and $p_n$ at the minor base. The cylinder revolves in front of this wheel, the latter being kept in contact therewith by means of a suitable desmodromic movement, and the cylinder, which advances parallel to a generator, is at the same time moved, at a uniform rate, from an angle of inclination $\alpha_1$ to an angle of inclination $\alpha_n$. By this means a series of trapeziums are traced on the cone, corresponding to the spaces between conical teeth the pitch of which varies from $p_1 = P_1 \cos \alpha_1$ to $p_n = P_n \cos \alpha_n$, the bases of the trapeziums being equal to $$Q\, p_1 = Q\, P_1 \cos \alpha_1$$

and $$Q\, p_n = Q\, P_n \cos \alpha_n$$

respectively.

In the preceding remarks consideration has been given to the points A and B given by the intersection of all the threads considered solely with regard to their primaries, as if the latter coincided. In practice the primaries of the superposed threads do not coincide, since all the threads have the same external diameter and heights varying according to the pitch. Moreover, each intersection of the threads, at any distance from the primaries, will give a series of points, of which A and B may be considered as the centers of the figure.

Considering one thread of pitch $p_1$, $a\, b\, c\, e$ (Figs. 4, 5 and 6), one, for example with straight sides for the sake of clearness, the external diameter of the cutter carrying this thread will be $D\,\pi$ and the external development of said cutter will be — D. The primary $d$ of this thread will be such that $$D = d + f(p_1).$$

Let another thread of pitch $p^n{}_1$, $h\, b\, f\, g$ be superposed on the first thread, the external diameter remaining the same and the primary $d_n$ being such that $$D = d^n + f(p^n{}_1),$$

and let the following points of intersection of the two threads be determined: 1. On the outer diameter of the cutter, represented in the diagram by the line S; 2. On the primary diameter of the smaller thread, represented in the diagram by the line Q; 3. On the primary diameter of the larger thread, represented by the line P; 4. At the tooth-base of the smaller thread, represented by the line R. These points of intersection form two series of points $s\ q\ p\ r$ on the generator X Y of the cutter-cylinder, and they bisect, in the center of its length, the thread resulting from the superposition of the two pitches $p_1$ and $p^1{}_1$. These points lie precisely in this case on two straight lines $s-r$ and $s^1-r^1$ on which are also all the points of intersection $d\ b\ c\ e$ and $h\ b\ f\ g$. If now a thread $h\ b\ i\ j$ of intermediate pitch $p^k$ be taken it will be found that the points of intersection thereof with the two previously considered threads fall on the lines $s\ r$ and $s^1\ r^1$, and that moreover, the intersection of the threads with the primary of, for example, the large thread $a\ b\ c\ e$ (line P in the diagram) coincides with the point $p-p^1$. The lines $s\ r$ and $s^1\ r^1$ therefore indicate the zone of the points of oscillation hereinbefore referred to. It therefore follows that the cutter can be determined by merely superposing the two extreme threads $a\ b\ c\ e$ and $h\ m\ f\ g$ (Fig. 7), but in this case projections $h\ n\ a$ and $g\ o\ e$, which would be removed by intermediate threads are left between the thread-bases, these projections are removed and the cutter assumes a shape such that the lines $a-h$ and $e-g$ are straight.

A cutter for cutting conical gear-wheels by the method described can be produced in the following manner (see Fig. 8). A deep thread of pitch $P_1$, with straight sides $o\ b$ and $c\ e$, is cut by means of a lathe in a steel cylinder of diameter D (Fig. 8), so as to produce an endless screw of pitch $P_1$ and primary diameter $$d_1 = D - \lambda P_1,$$

$\gamma$ being a predetermined coefficient, since the height of the threads of an endless screw, with reference to the primary diameter, is always a function of the pitch. If $\alpha_1$ is the angle of inclination of this thread to the primary cylinder, the screw, inclined at the said angle $\alpha_1$ will be adapted to mesh with cylindrical wheels, meshing line of which corresponds to the slope of the surfaces $a$, $b$ and $c\ e$ and the pitch of which is $$p_1 = P_1 \cos \alpha_1$$

$\alpha_1$ being obtained from the equation $$\tan \alpha_1 = \frac{P_1}{\pi d_1}.$$

In other words, the screw is adapted to cut any cylindrical gear-wheel of pitch $p_1$. The next step is to cut, on the same steel cylinder, a second thread $f\ g\ h\ i$ of pitch $P_n$, similar to the first thread in a plane passing through the axis of the cylinder. The primary diameter of the "screw" having this thread will be $$d_n = D - \lambda P_n.$$

This second thread destroys in part the thread of pitch $P_1$ and produces, as it were, at either side of the point O, where the central convolutions of the two threads intersect each other, a resultant thread enlarged at its center and terminating in two points. Each section of this thread through a cylinder having the same axis as the original cylinder will have as development a parallelogram comparable to the parallelogram A D B C shown in Fig. 1, all points of this parallelogram such as A and B, coinciding with intersections M N, M$^1$ N$^1$ of the lateral surfaces of the threads $P_1$ and $P_n$ (Fig. 9). By the second operation, therefore, the end-less screw is reduced to a resultant thread adapted to exactly mesh: Firstly, with gear wheels of pitch $P_1$, when said thread is inclined at an angle $\alpha_1$, and secondly, with gear-wheels of pitch $p_n = P_1 \cos \alpha_n$, then said thread is inclined at the angle $\alpha_n$ corresponding to that of the thread of pitch $P_n$.

The lateral surfaces of all threads of pitch $P_k$ intermediate to $P_1$ and $P_n$, produced in the same manner with central convolutions passing through O, intersect each other on the same lines as the threads $P_1$ and $P_n$, and these two lines M N and M$^1$ N$^1$ are all that remain of the lateral profiles of the threads of intermediate pitch. If the projecting part left by the bases of the threads $P_1$ and $P_n$ is so cut away as to join by a straight line the end-points of said bases contained in each radial plane, a screw is obtained, having the shape shown in Fig. 8 and adapted to mesh:—Firstly, with gear-wheels of pitch $p_1$, as already explained; secondly, with gear-wheels of pitch $p_n$, as has also been explained; thirdly with any gear-wheels of pitch $p_k$ intermediate to $p_1$ and $p_n$, if the thread is inclined at the angle $\alpha_k$ of the thread $P_k$, so that $$p_k = P_k \cos \alpha_k.$$

In this case, however the lines M N and M$^1$ N$^1$ only touch the sides of the teeth of the wheel meshing with the screw. If the screw thus produced is converted into a cutter, care being taken to retain the lines M N and M$^1$ N$^1$ as cutting edges, a cutter is obtained adapted to be operated on the principle of the ordinary helicoidal cutter and to cut gear-wheels of pitches varying from $p_1$ to $p_n$, according to the angle $\alpha_1 \ldots \alpha_k \ldots \alpha_n$ at which the cutter is inclined. This cutter is, however, too short, and cannot comprise a sufficient number of threads of each pitch to envelop the curve of the teeth to be cut and to give thereto the desired involute. It is, therefore, necessary to supplement this lack of length by displacing the cutter in the direction of its axis with a reciprocating movement of such amplitude that the cutter-threads entirely envelop the tooth to be cut. This movement is transmitted to the wheel by means of differential gear included in the mechanism which connects the wheel with the cutter, the wheel being advanced and retarded with an amplitude corresponding to that of the axial displacement of the cutter.

It is obvious that a cutter of this kind can be used for cutting conical gear-wheels. For this purpose it is sufficient that the cutter should receive, in addition to the movements imparted to a helicoidal cutter for cutting cylindrical gear-wheels, the following two additional movements:—1. The reciprocating movement in the direction of its axis, said movement being transmitted to the wheel in the manner already described, as shown by the dotted positions 2, 3 for the cutter 1 in Fig. 9. 2. A movement by which the angle of inclination of the cutter is changed, at a uniform rate, from $\alpha_1$ to $\alpha_n$, assuming the tooth-pitch to be $p_1$ at the major wheel-base and $p_n$ at the minor base as will be seen by comparing the angle of inclination of the cutter in Figs. 9 and 10 respectively; this movement is controlled by the advance of the cutter along the generators of the cone at the bases of the teeth.

The system described can be used for cutting helicoidal bevel-gears as well as for cutting straight gears.

For this purpose it is sufficient to incline the cutter, with regard to the axis of the gear, at an angle equal to the inclination of the helicoidal teeth, without prejudice to the variable inclination corresponding to the pitch. The cutter advances tangentially along the base of the tooth-spaces, but according to the tangent of the helix wound on the cone, which determines the gear, as is done in the Gadinot machine for cutting helicoidal cylindrical gears. For the same purpose a differential device might be used, as in the Reinecker, Biernatzki and other machines for cutting helicoidal cylindrical gears.

What I claim is:—

A spiraleoidal cutter for cutting straight gears, helicoidal gears and bevel gears having its cutting teeth in a helix reduced towards its extremities and formed upon a surface of revolution said helix being composed by the intersection of threads of different pitch placed symmetrically with regard to given points on said surface.

In witness whereof I have signed this specification in the presence of two witnesses.

LOUIS BOISARD.

Witnesses:
 JEAN GERMAIN,
 GUILLAUME PIOCHE.